United States Patent [19]

Staggs et al.

[11] Patent Number: 4,481,594

[45] Date of Patent: Nov. 6, 1984

[54] METHOD AND APPARATUS FOR FILLING POLYGONS DISPLAYED BY A RASTER GRAPHIC SYSTEM

[75] Inventors: Kevin P. Staggs, Glendale; Charles J. Clarke, Jr.; James C. Huntington, both of Phoenix, all of Ariz.

[73] Assignee: Honeywell Information Systems Inc., Phoenix, Ariz.

[21] Appl. No.: 340,143

[22] Filed: Jan. 18, 1982

[51] Int. Cl.[3] .......................... G06F 3/14; G09F 9/30

[52] U.S. Cl. .................................... 364/521; 340/701; 340/703

[58] Field of Search ............... 364/521, 522, 718, 719; 340/701, 703, 747, 751

[56] References Cited

U.S. PATENT DOCUMENTS

| | | | |
|---|---|---|---|
| 3,911,418 | 10/1975 | Takeda | 340/703 |
| 3,925,776 | 12/1975 | Swallow | 340/747 |
| 3,944,997 | 3/1976 | Swallow | 340/747 |
| 4,117,473 | 9/1978 | Habeger, Jr. et al. | 340/703 X |

OTHER PUBLICATIONS

W. M. Newman et al., *Principles of Interactive Graphics*, Second Edition, 1979, pp. 232-239.

*Primary Examiner*—Joseph F. Ruggiero

*Assistant Examiner*—Gary V. Harkcom

*Attorney, Agent, or Firm*—E. W. Hughes

[57] ABSTRACT

Method and apparatus for filling polygons displayed by a color CRT monitor of a raster graphic system. A graphic controller produces control signals which control the mode of operation of the system, two of which are a fast polygon write, or fast-fill write, mode and a fast polygon display, or display fast-fill, mode. When the system is in the fast polygon write mode, the graphic controller reads fast-fill toggle bits from a frame memory of boundary pixels defining initial and terminal pixels of each fill element. The fast-fill toggle bits of boundary pixels are set if the toggle bit read from memory was not set and, if set, it will reset it. In the fast polygon display mode, the system senses the initial boundary pixel of each fill element by its fast-fill toggle bit being set and applies the color address of the initial boundary pixel to a color look-up memory until the terminal pixel of the fill element is read from the memory. Thereafter, the color address of each pixel of a horizontal scan line is applied to the color look-up memory in synchronization with the raster scan until another initial boundary pixel of another fill element is sensed, etc., or until the end of the horizontal scan line is reached.

8 Claims, 2 Drawing Figures

METHOD AND APPARATUS FOR FILLING POLYGONS DISPLAYED BY A RASTER GRAPHIC SYSTEM

BACKGROUND OF THE INVENTION

1. Field of the Invention.

This invention is in the field of computer generated raster graphics and more particularly relates to a method and apparatus for filling polygons displayed by a color CRT monitor of a computer generated raster graphic system.

2. Description of the Prior Art.

Raster scan CRT displays form a principal communication link between computer users and their hardware/software systems. The basic display device for computer generated raster graphics is the CRT monitor, which is closely related to the standard television receiver. In order for the full potential of raster graphics to be achieved, such displays require support systems, which include large-scale random access memories and digital computation facilities. As the result of recent developments, particularly of large-scale integrated circuits, the price of digital memories has been reduced significantly and computers in the form of microcomputers are available which have the capability of controlling the displays at affordable prices. As a result, there has been a surge of development in raster graphics. Typically, each pixel in a rectangular array of picture elements of a CRT is assigned a unique address, comprising the x and y coordinates of each pixel in the array. Information to control the display is stored in a random access memory (RAM) at locations having addresses corresponding to those assigned to the pixels. The source of pixel control data written into and stored by the RAM is typically a microcomputer located in a graphic controller which will write into the addressable memory locations the necessary information to determine the display. This information frequently includes an address in a color look-up memory, at which location in the color look-up memory there is stored the necessary binary color control signals to control the intensity of the color of each pixel of an array. The horizontal and vertical sweep of the raster scan is digitized to produce addresses of pixels, which addresses are applied to the memory in which the controller has previously written the information determinative of the display; i.e., the color and intensity of the addressed pixel as it is scanned in synchronism with the raster scan. The data stored in the addressable locations of the color look-up memory is read out of the addressed location in the color look-up memory and the necessary color control signals are obtained. The color control signals are converted to analog signals by digital to analog circuits and the resulting analog signals are applied to the three color guns of the typical CRT to control the intensity and color of each pixel as it is scanned.

Raster graphic systems having the capability of displaying polygonal shapes which are filled with color are known. The most relevant information concerning such techniques for filling polygons is found in an article by Bryan Ackland and Neil Weste, "Real Time Animation Playback on a Frame Store Display System", *Computer Graphics,* Quarterly Report of SIGGRAPH-ACM (July, 1980), pp. 182–188. One problem with prior art polygon fill techniques is that such techniques require a large amount of I/O activity between the graphic controller and the frame memory, which, of course, limits the capability of the graphic controller to do other things. A second problem is that an ambiguity occurs when the boundaries of a polygon intersect the same pixel of a horizontal scan line. As a result, special software programs are required by the graphic controller to prevent the system from continuing a polygon color fill element beyond the intersection. To describe the ambiguity in other words, how does one handle a situation in which the length of a fill element is one pixel.

SUMMARY OF THE INVENTION

The present invention provides both method and apparatus for filling polygons displayed by a color CRT monitor of a computer generated raster graphic system. The polygons are filled by defining color fill lines which coincide with horizontal scan lines with the first pixel of the fill element corresponding with the intersection of a boundary of the polygon and a given horizontal scan line and the end or terminal boundary pixel being determined by the intersection of a second boundary line of the polygon and the horizontal scan line. It should be noted that there can be more than one fill line per horizontal scan line and that it is not necessary that there always be a terminal pixel for a fill element as the terminal pixel of the element may fall outside the boundary of the raster of the CRT monitor. The system includes a frame memory of adequate size or capacity to store color addresses, fast-fill toggle bits, and possibly other control signals at memory locations, the addresses of which correspond to those of the pixels of the CRT monitor. The raster scan logic circuit of the system will apply addresses of the pixels to the frame memory in synchronism with the raster scan so that the color addresses and fast-fill toggle bits for each pixel are read from the memory in the proper time sequence. A color look-up memory is provided in which digital color control signals are stored in memory locations whose addresses correspond to the color addresses stored in the frame memory. The color control signals are converted to analog signals, voltages, to control the color guns of the typical CRT to control the color and intensity of each pixel of the display. The system includes a graphic controller which has the capability of writing binary data into address locations of the frame memory, reading data from said locations, and of determining the initial and terminal pixels of each fill element of a horizontal scan line of the polygon to be filled.

When the graphic controller produces a display fast-fill polygon signal, the graphic controller is in its display fast-fill mode in which the polygons displayed are filled by color fill elements which have a uniform color; i.e., each pixel has the same color and intensity. When the system is in the fast polygon fill write mode, the graphic controller will compute or determine the initial and terminal pixels of each color fill element of each horizontal scan line. Having determined the locations of boundary pixels, the controller executes a read, modify, restore memory instruction during which it will read from the frame memory the fast-fill toggle bit stored at the addressed location of a boundary pixel and will set the fast-fill toggle bit of the boundary pixel if, and only if, the fast-fill toggle bit read from that memory location was not previously set and, if set, the fast-fill toggle bit will be reset during the restore, or write, portion of the instruction. Once the boundary pixels of the fill element have been identified by their fast-fill toggle bits having been set as described above, the graphic controller will produce the display fast-fill mode control signal which places the system in its display fast-fill mode. As the color addresses and fast-fill toggle bits for each pixel are read from the frame memory, the first fast-fill toggle bit read from memory which is set will cause the color address stored at that initial boundary pixel to be applied to the color look-up memory until the next set toggle bit is read from the frame memory which identifies the terminal pixel of the fill element. Thereafter, the graphic system will apply the color address for each of the pixels as scanned to the color look-up memory to determine the color and intensity of each pixel. Since there can be more than one fill element on a horizontal scan line, the odd-numbered toggle bits read from the frame memory during the scan of a horizontal scan line of a raster are the initial pixels and the even-numbered toggle bits identify the terminal boundary pixels. It is, of course, possible that the end of a horizontal scan line will be reached before a terminal pixel is read from the frame memory, in which case the system begins each scan line with the system in its normal operating mode; i.e., the color address of each pixel stored in the frame memory determines its color and intensity until the first boundary pixel is sensed. The system continues to operate as described above for each horizontal scan line of the raster as long as the system is in its fast-fill display mode.

It is, therefore, an object of this invention to provide an improved method and apparatus for filling polygons displayed by a color CRT monitor of a raster graphic system.

Another object of this invention is to provide method and apparatus for minimizing the amount of data that must be written into the frame memory of a raster graphic system in order to implement a fast-fill display mode of operation.

It is still another object of this invention to provide method and apparatus which prevent ambiguities with respect to fast-fill mode display occurring where the boundaries of a polygon intersect.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DETAILED DESCRIPTION OF THE INVENTION

Figure 1:
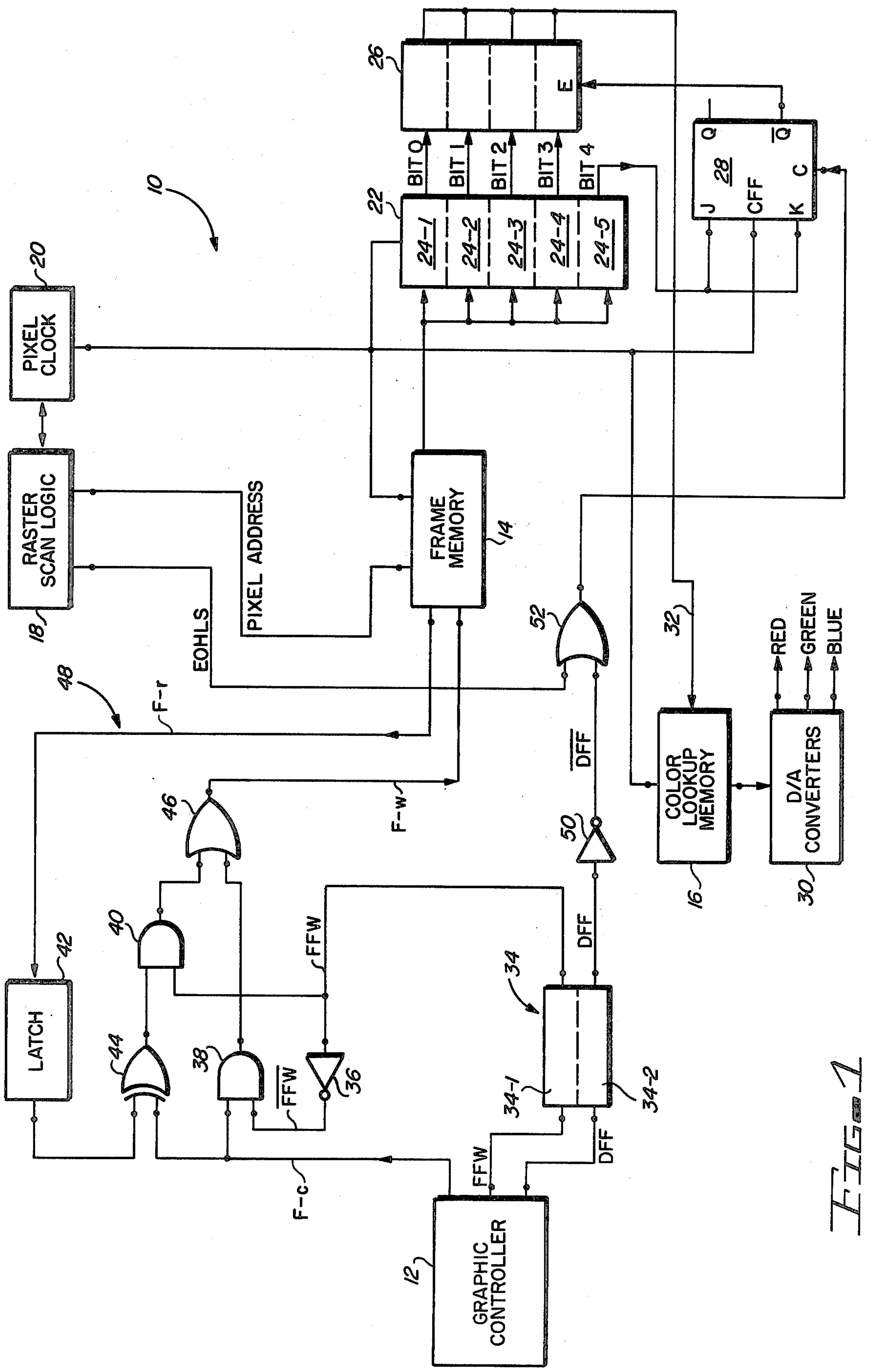
FIG. 1 is a block diagram of portions of a computer generated raster graphic system practicing the invention.

In FIG. 1, there is illustrated a portion of a computer generated, or controlled, raster graphic system 10, and more specifically apparatus for filling polygons displayed by system 10. Graphic controller 12 has the capability of writing into or reading from random-access frame memory 14 and color look-up memory 16, binary digital information which is used to control the intensity and color of each picture element, pixel, of a conventional CRT monitor which is not illustrated. Raster scan logic 18 includes conventional circuits to digitize the horizontal and vertical sweep signals of the raster scan of the CRT monitor so that for each pixel on the face of the CRT there is an associated or corresponding number, or address. To uniquely identify each of the 640 pixels in a horizontal scan line and the 480 horizontal scan lines of a standard CRT raster, requires a 19-bit address with the "x" component comprising 10 bits and the "y" component 9 bits. The "x" address corresponds to the ordinate and the "y" to the abscissa of the pixels of a substantially rectangular raster. While in FIG. 1 frame memory 14 and color look-up memory 16 are indicated as being separate, they may be combined, or located, in one conventional random-access memory. Pixel clock 20 produces a clock pulse each time that a pixel is scanned. The output of pixel clock 20 is used in reading and writing data from and into memories 14 and 16, as well as by other circuitry of this invention, as will be described below.

To minimize the size of the random-access memory 14 and to permit the use of slower, less costly memories, the color look-up addresses for the pixels are read from frame memory 14 as a group, or for a set, of eight adjacent pixels lying in a horizontal scan line. Sets of eight such adjacent pixels of a horizontal scan line define a horizontal line segment. The color look-up address for each pixel will have, in the preferred embodiment, stored with it a fast-fill toggle bit F which is used to identify the first and last pixel of a horizontal color fill element of a polygon to be filled when system 10 is in its fast-fill mode, as will be described more fully below. Thus, in the preferred embodiment, five bytes of 8 bits each are stored in each addressable memory location of frame memory 14 at an address corresponding to one of the eight pixels of a line segment, normally the first pixel scanned by the electron beams of the electron guns of a CRT monitor. The five bytes as they are read out of frame memory 14 are stored in buffer circuit 22 which, in the preferred embodiment, consists of five conventional shift registers 24-1 to 24-5, with one byte of 8 bits being loaded into each of the shift registers 24-1 to 24-5. With each clock pulse from pixel clock 20, 4 bits of a color address are transmitted from buffer 22 to transparent latch 26 with the fast-fill toggle bit F being applied to the J and K input terminals of control flip flop 28. Based on the value of the fast-fill toggle bit F when system 10 is in its fast-fill display mode, transparent latch 26 will either transmit the 4-bit color look-up address transmitted to it from buffer 22 to color memory 16, or will latch the color look-up address applied from buffer 22 and continually apply the latched address to color look-up memory 16 until unlatched.

In color look-up memory 16 at locations having addresses corresponding to the color addresses applied by transparent latch 26, there are stored color control signals which are used to control the intensity of the electron beams of the color guns of a conventional color CRT monitor and thus determine the color and intensity of each pixel of the array of the CRT monitor as it is scanned. In the preferred embodiment, an 8-bit byte is stored in color look-up memory 16 at locations corresponding to the color addresses applied. In synchronism with the scanning of each pixel of the array, or raster, of the pixels, the color control signals, each being an 8-bit byte, are read out of color look-up memory 16 and applied to conventional D to A converter 30. D to A converter 30 changes 6 of the 8 binary signals into three analog signals for controlling the intensity of the red, green and blue electron beam guns of a conventional CRT monitor. In addition, in the preferred embodiment, two bits of a color control signal are applied to a fourth D to A converter which converts these two bits into a monochrome analog signal that can be used to produce a permanent record of the raster display using conventional equipment, as is well known in the art.

Raster scan logic 18 applies in synchronism with the horizontal and vertical sweep signals controlling the scanning of the pixels of the color CRT monitor, binary signals which are coordinates, or addresses, of the pixels as they are being scanned. For each line segment of eight pixels, there is stored in frame memory 14 appropriate information for controlling the display of each pixel of each line segment as it is scanned. In the preferred embodiment, memory 14 has five planes. Thus, each addressable location of each plane has the capacity for storing a byte of eight bits. The five bytes for each addressable location in frame memory 14 for a given line segment are loaded into the five shift registers 24-1 to 24-5, with one byte being stored in each shift register. With each clock pulse from pixel clock 20, each shift register 24-1 to 24-5 will produce, or shift out, one bit. Four bits from registers 24-1 to 24-4 are the graphic color address and are applied to transparent latch 26. The output of transparent latch 26, a color address, is applied by color address bus 32 to color look-up memory 16. The fifth bit, toggle bit F, from shift register 24-5 is applied to the input terminals of control flip flop 28.

Graphic controller 12, which includes a microcomputer, has the ability, or capability, of calculating the addresses of the pixels which determine, or form, the boundaries of polygons, as well as the ability to write data into memories 14, 16, read data from them, and to read, modify and to restore data from and into memories 14, 16. To simplify FIG. 1, the address bus, data buses and control lines between controller 12 and memories 14, 16 are omitted, except for the data lines for the toggle bit F which is illustrated. Controller 12 also has the capability of producing control signals which determine the mode of operation of system 10. Two of these mode or fast polygon write mode, control signals are a fast-fill write mode signal, FFW, and a display fast-fill mode, or fast polygon display mode, signal, DFF. The control signals FFW and DFF are applied to mode control latches 34-1 and 34-2.

When graphic controller 12 has or while calculating the addresses, or locations, of boundary pixels of polygons displayed on the screen of a CRT monitor which polygons are to be filled; i.e., typically all the pixels within the boundary of a given polygon will have substantially the same color and intensity, controller 12 will produce the fast-fill write mode signal FFW which is stored in latch 34-1 as long as FFW is produced by controller 12. The signal FFW is inverted by inverter 36 so that the signal $\overline{\text{FFW}}$ is applied to one input terminal of two input AND gate 38. The signal FFW is also applied to one terminal of two input AND gate 40.

When controller 12 has determined the coordinates, or address, of a boundary pixel of a polygon, controller 12 executes a read/modify/restore memory instruction which fetches the fast-fill toggle bit F-r for the boundary pixel read from frame memory 14, which bit F-r is applied to latch 42 and by latch 42 to one input terminal of exclusive OR circuit 44. The fast-fill toggle bit F-c is produced by controller 12 to identify, or denote, that the pixel whose address has been transmitted to frame memory 14 by graphic controller 12 is a boundary pixel of a polygon to be filled when system 10 is operating in its fast-fill display mode. The signal F-c is applied to the exclusive OR circuit 44 and to one terminal of AND gate 38. The output of circuit 44 is applied to AND gate 40 and the output of AND gates 38, 40 are applied to two input OR gate 46. The output of gate 46 is the fast-fill toggle bit F-w which is written into memory 14 at the completion of each read/modify/restore memory instruction.

When FFW is not true, system 10 is not in the fast-fill write mode, and a logical one is applied to AND gate 38 which enables AND gate 38 so that gate 38 transmits the fast-fill toggle bit F-c produced by controller 12 to OR gate 46. Bit F-c is then applied to and is written into frame memory 14. When FFW is not true, a logical zero is applied to gate 40 which disables gate 40 so that only the output of AND gate 38 determines the value of F written into the addressed location in frame memory 14.

When mode control signal FFW is true, gate 38 is disabled and AND gate 40 is enabled. Exclusive OR circuit 44 will produce a logical one output if, and only if, only one of its two inputs is true or a logical one and will produce a logical zero if F-r and F-c are logical ones.

Ambiguity resolution circuit 48, which includes exclusive OR circuit 44, avoids, or resolves, the problem which occurs when the same pixel is both the initial and terminal pixel of a fill element. This situation is created when two boundary lines of a polygon, neither of which is a horizontal line, intersect. If the fast-fill toggle bit of the pixel at such an intersection remains set when controller 12 has completed its task of defining the polygons to be filled, the color and intensity of the display for the rest of that horizontal scan line on which the pixel lies would remain that specified for the intersecting, or double boundary, pixel; however, such pixels other than the first would not lie within the boundary of a polygon. Ambiguity resolution circuit 48 prevents such a situation from occurring and, by doing so, reduces the problems that controller 12 must solve or avoid. Circuit 48 thus frees up controller 12 for other computational tasks, or reduces the computational requirements placed on controller 12, so that the controller 12 can perform other tasks.

After having set the fast-fill toggle bits of boundary pixels which define the initial and terminal pixels of the color fill elements which fill the polygons to be displayed, system 10 is placed in its display fast-fill mode by controller 12 producing the mode control signal DFF. Signal DFF is applied to control latch 34-2, and the signal DFF from latch 34-2 is applied to inverter 50. The inverted signal $\overline{\text{DFF}}$ from inverter 50 is applied to one input terminal of OR gate 52. The other input terminal of OR gate 52 is connected to raster scan logic circuit 18 which applies an end of horizontal line scan signal, EOHLS, to one input terminal of OR gate 52 each time the scan, or sweep, of a horizontal line of the raster of the CRT tube of the CRT monitor is completed. The output of OR gate 52 is applied to the clear terminal C of J-K flip flop 28. The J and K terminals of flip flop 28 have applied to them the fast-fill toggle bits F of each pixel, with toggle bit F being the highest order bit, bit 4 of the 5 bits stored in the frame memory for each pixel of the raster. A fast-fill toggle bit F is shifted out of the shift register 24-5 of memory buffer circuit 22 in synchronism with the color address of each pixel in synchronism with the scanning of the raster. The output terminal $\overline{Q}$ of flip flop 28 is connected to the latch enable terminal E of transparent latch 26. The output signals of transparent latch 26 follow the data inputs when, in this example, $\overline{Q}$ is high or a logical one, and they are stable when the signal $\overline{Q}$ is low. Thus, the signals applied to transparent latch 26 from buffer circuit 22 when $\overline{Q}$ is low will be latched and continually applied to color look-up memory 16 over color address bus 32 as long as $\overline{Q}$ is low.

When the signal DFF stored in latch 34-2 is a logical 1 or true, the signal $\overline{DFF}$ will be a logical zero and the output of OR gate 52 will be a logical zero until raster scan logic 18 produces the signal EOHLS. Thus, as each horizontal line of the raster is scanned, and the color addresses in the fast-fill toggle bits F for each pixel are produced by memory buffer 22 in substantial synchronization with the scan of the CRT of the monitor, $\overline{Q}$ of flip flop 28 will be high until the first fast-fill toggle bit F which is set is shifted out of register 24-5 and applied to the J and K terminals of flip flop 28. The first set toggle bit F will cause flip flop 28 to change state, with $\overline{Q}$ becoming low. This causes latch 26 to latch the 4 bits, bits 0–3, the color address of the initial boundary pixel of a color element, which color address latch 26 will continue to apply to the color look-up memory 16 until the next fast-fill toggle bit F which is set, or a logical 1, is applied to the J and K terminals of flip flop 28. When this happens, flip flop 28 will change state with $\overline{Q}$ being high. When $\overline{Q}$ goes high, latch 26 becomes transparent and transmits to the color look-up memory 16, the color address bits of each pixel as they are applied to the input terminals of latch 26.

As every odd-numbered fast-fill toggle bit F is applied to flip flop 28, latch 26 latches the color address of the initial boundary pixel of a color element and will continue to apply the color address of the boundary pixel to the color look-up memory 16 until an even-numbered fast-fill toggle bit F, the terminal boundary pixel of the color element, is applied to flip flop 28. Thus, odd-numbered fast-fill toggle bits F of a given horizontal line of the raster when applied to flip flop 28 constitute or identify the initial pixels of fill elements and the even-numbered fast-fill toggle bits F identify the terminal boundary pixels of fill elements.

When the end of the horizontal line scan is completed, the signal EOHLS goes high and is applied through OR gate 52 to clear terminal C of flip flop 28. This high signal applied to terminal C clears flip flop 28 so that $\overline{Q}$ is high, which places transparent latch 26 in its transparent mode at the beginning of the next horizontal line scan.

When the display fast-fill mode signal DFF is not true, or is low, the signal $\overline{DFF}$ applied to OR gate 52 will be a logical one or high and, since it is applied to the clear terminal C of flip flop 28 by OR gate 52, it will hold the $\overline{Q}$ output high, irrespective of whether or not a fast-fill toggle bit F of one or more pixels is set. As a result, when system 10 is not in the display fast-fill mode, transparent latch 26 will be maintained transparent.

Figure 2:
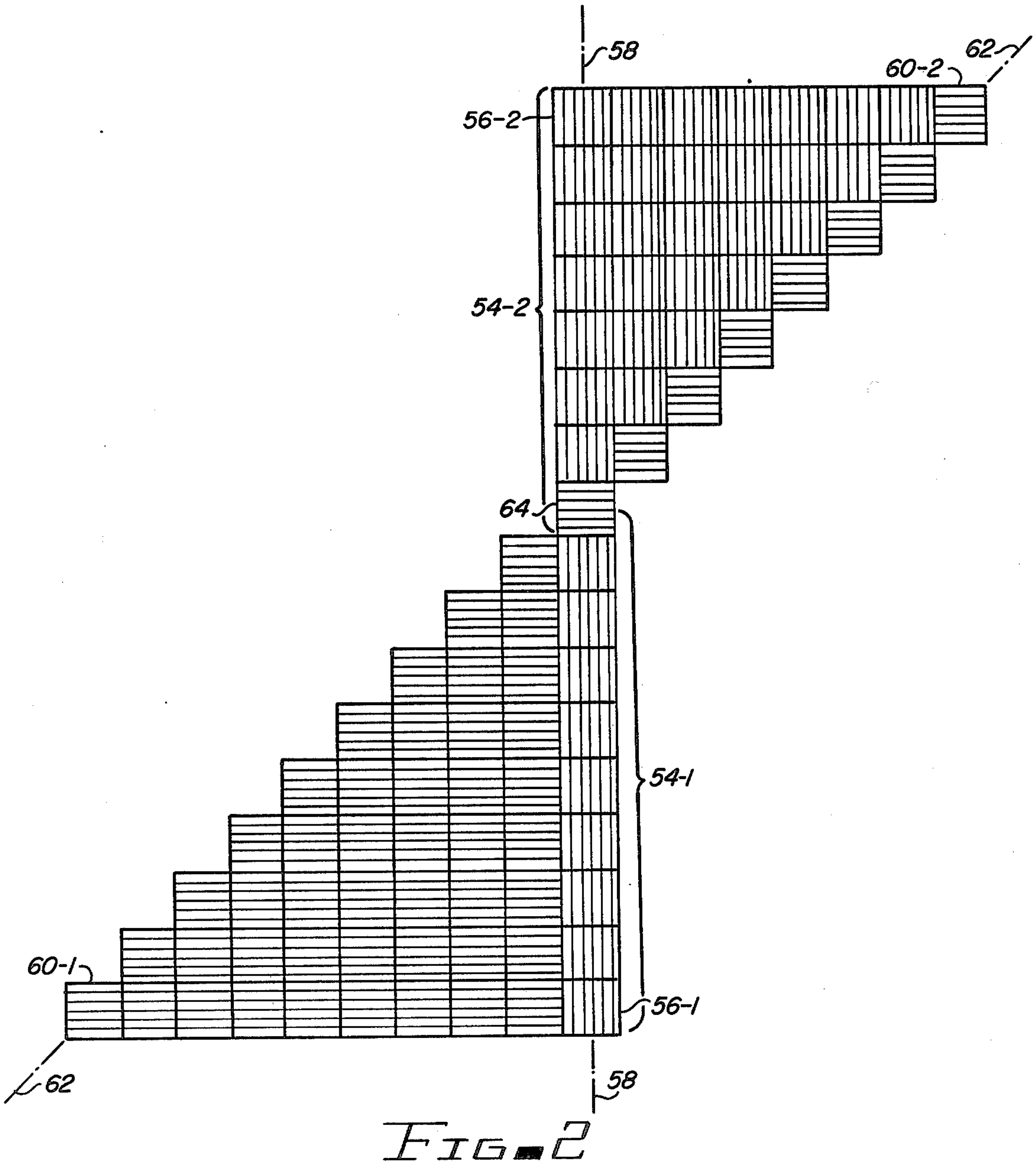
FIG. 2 illustrates a portion of the raster of a CRT display of polygons, the boundaries of which intersect when the raster graphic system is in its display fast-fill mode.

In FIG. 2, there is illustrated a portion of the display appearing on the face of a cathode ray tube of a CRT monitor of system 10, when system 10 is in its display fast-fill mode of operation. This is accomplished by graphic controller 12 having applied the mode control signal DFF to mode control latch 34-2. Polygons 54-1 and 54-2 are formed by a vertical column of boundary pixels 56-1 to 56-2 which define vertical boundary line 58 and a sloping column of boundary pixels 60-1 to 60-2 which define sloping boundary line 62. Pixel 64 is an intersecting, or double boundary, pixel since it lies on both vertical boundary line 58 and sloping boundary line 62. Pixel 60-1 and 56-1 define a horizontal row of boundary pixels, the base of polygon 54-1, while horizontal row of boundary pixels 56-2 to 60-2 define the third side, or the upper boundary, of polygon 54-2.

When system 10 is in its fast-fill write mode, controller 10 will, for example, calculate the coordinates, or addresses, of the boundary pixels defining boundary line 58 and will set the toggle bits of these boundary pixels in memory 14, as well as will write into memory locations of the boundary pixels a color address which determines the color and intensity of each of the boundary pixels defining boundary line 58. In FIG. 2, these pixels are shaded to represent the color red. Controller 12 will then, for example, calculate the addresses of the pixels of boundary line 62 and will write into the memory locations of each of the pixels defining sloping boundary line 62 a color address and set the fast-fill toggle bit of each of these boundary pixels. However, with respect to intersecting pixel 64, since its toggle bit was set when controller 12 wrote into memory 14 the pixels defining boundary line 58, ambiguity resolution circuit 48 will reset the toggle bit of intersecting boundary pixel 64. Thus, to the right of pixel 64 in the horizontal sweep line of the raster on which pixel 64 lies, the color and intensity of each pixel will be determined by the color address stored at the address of each such pixel in memory 14. With respect to horizontal boundary lines such as those determined by pixels 60-1 and 56-1, as well as by pixels 56-2 and 60-2, controller 12 need not take any action since the color fill elements determined by pixels 60-1 and 56-1 also coincide with the third boundary of polygon 54-1.

When system 10 is placed in its fast-fill display mode, as the raster is scanned, as the horizontal line on which pixel 56-2 to 60-2 lie is swept, or scanned, the fast-fill toggle bit of pixel 56-2 will cause transparent latch 26 to latch the color address for pixel 56-2, which is shaded red in this example, and will apply this color address to color look-up memory 16 until the fast-fill toggle bit of pixel 60-2 is applied to control flip flop 28 which will cause latch 26 to become transparent. When latch 26 is transparent, it applies the color address stored in memory 14 for pixel 60-2 to the color look-up memory 16, blue in this example. System 10 continues to operate as above described with latch 26 in its transparent mode until the next pixel is addressed whose toggle bit is set, or until the scan of horizontal line on which pixel 64 lies is completed. Since the fast-fill toggle bit for pixel 64 is not set, latch 26 remains in its transparent mode of operation. Thus, as the raster scan progresses, the fast-fill toggle bit of the initial boundary pixels of boundary line 62 which is set will latch the color address blue of each of the initial pixels of the line elements, for example, which color address will be continuously applied to the color look-up memory 16 until set fast-fill toggle bit of the terminal boundary pixels, in this case those lying on vertical boundary line 58 of each of the color line elements is sensed, or applied, to control flip flop 28 to cause latch 26 to become transparent.

From the foregoing, it is believed readily apparent that the method and apparatus of this invention minimizes the amount of I/O communications between graphic controller 12 and the frame memory in that only the initial and terminal pixels of each color line element used to fill a polygon need be written into the frame memory. It is also apparent that the method and apparatus of this invention will prevent ambiguities with respect to fast-fill mode display occurring where the boundaries of a polygon intersect.

It should be evident that various modifications can be made to the described embodiment without departing from the scope of the present invention.

We claim as our invention:

1. Apparatus for filling polygons displayed by a color CRT monitor of a computer generated raster graphic system, said system having a frame memory adapted to store color addresses and fast-fill toggle bits at memory locations whose addresses correspond to those of the pixels of the CRT of the monitor, raster scan logic for reading from the frame memory and, for producing in synchronism with the raster scan of the CRT, the color address and fast-fill toggle bit for each pixel, a color look-up memory adapted to store color control signals in memory locations, the addresses of which correspond to color addresses stored in the frame memory; a graphic controller having the capability of writing data into addressed locations of the frame memory, of reading data from said locations and of determining the initial and terminal pixels of a fill element of a horizontal scan line of a polygon, and of producing control signals for controlling the mode of operation of said system, said system having a fast polygon write mode and a fast polygon display mode; said apparatus comprising:

means for reading, when the system is in fast polygon write mode, the fast-fill toggle bits from memory locations in the frame memory of boundary pixels defining the initial and terminal pixels of each fill element of each horizontal scan line, for setting the fast-fill toggle bits of boundary pixels of each fill element if and only if the fast-fill toggle bit read from the memory location for each such boundary pixel is not set, and, if set, for resetting it and for writing the fast-fill toggle bits of boundary pixels of each fill element, and means for applying, when the system is in the fast polygon display mode, the color address stored at the initial boundary pixel of each fill element of each horizontal scan line to the color look-up memory in synchronization with the scan thereof until the terminal pixel of the fill element is read from the frame memory, thereafter for applying the color address of each pixel of the horizontal scan line to the color look-up memory in synchronization with the raster scan until another initial boundary pixel of another fill element of the horizontal scan line is is read from memory, or until the end of the horizontal scan line is reached, as long as the system is in its fast polygon display mode.

2. The method of filling polygons displayed by a color CRT monitor of a computer generated raster graphic system, said system having a frame memory adapted to store color addresses and fast-fill toggle bits at memory locations whose addresses correspond to those of the pixels of the CRT of the monitor, raster scan logic for reading from the frame memory and for producing in synchronism with the raster scan of the CRT, the color address and fast-fill toggle bit for each pixel, a color look-up memory adapted to store color control signals in memory locations, the addresses of which correspond to color addresses stored in the frame memory; a graphic controller having the capability of writing data into addressed locations of the frame memory, of reading data from said locations and of determining the initial and terminal pixels of a fill element of a horizontal scan line of a polygon, and of producing control signals for controlling the mode of operation of said system, said system having a fast polygon write mode and a fast polygon display mode; said method comprising the steps of:

reading, when the system is in fast polygon write mode, the fast-fill toggle bits from memory locations in the frame memory of boundary pixels defining the initial and terminal pixels of each fill element of each horizontal scan line, setting the fast-fill toggle bits of boundary pixels of each fill element if and only if the fast-fill toggle bit read from the memory location for each such boundary pixel is not set, and if set, resetting it, and writing the fast-fill toggle bits into memory locations of the frame memory corresponding to the boundary pixels of each fill element; and applying, when the system is in its fast polygon display mode, the color address stored at the address in the frame memory of the initial boundary pixel of each fill element of each horizontal scan line to the color look-up memory in synchronization with the scan thereof until the terminal pixel of the fill element is read from the frame memory, thereafter applying the color address of each pixel of the horizontal scan line to the color look-up memory in synchronization with the raster scan until the next initial boundary pixel of the next adjacent fill element of the horizontal scan line is read from memory, and repeating this step for each horizontal scan line until the end of each horizontal scan line is reached, and repeating this step for each horizontal scan line as scanned as long as the system is in its fast polygon display mode.

3. A computer generated raster graphic system comprising:

a CRT monitor including a raster scanned color cathode ray tube having a rectangular array of pixels;

a frame memory adapted to store a color address and a fast-fill toggle bit at memory locations whose addresses correspond to those of the pixels of the cathode ray tube;

raster scan logic means for reading from the frame memory and for producing in synchronism with the raster scan of the cathode ray tube the color address and fast-fill toggle bit for each pixel;

a color look-up memory adapted to store color control signals in memory locations, the addresses of which correspond to color addresses stored in the frame memory;

first-circuit means for applying the color addresses of each pixel produced in synchronism with the raster scan to the color look-up memory;

graphic controller means for writing a color address and a toggle fill bit into addressed locations of the frame memory, for reading data from said locations, for determining the addresses of initial and terminal pixels of fill elements with which a polygon is adapted to be filled, each fill element lying on a horizontal scan line of the raster, and for producing a fast polygon write mode control signal and a fast polygon display mode control signal;

ambiguity resolution circuit means for setting the fast-fill toggle bit of a boundary pixel under certain conditions:

said graphic controller means, after having produced a fast polygon write mode control signal and while this control signal is produced, reading from the frame memory the fast-fill toggle bits from memory locations in the frame memory of boundary pixels defining the initial and terminal pixels of each fill element, and applying said fast-fill toggle bits to the ambiguity resolution circuit means, said graphic controller means applying to the ambiguity resolution circuit means a fast-fill toggle bit having a logical value of 1 representing that the addressed memory location is that of a boundary pixel;

said ambiguity resolution circuit means for setting the fast-fill toggle bit stored in the addressed memory location if, and only if, the logical value of the fast-fill toggle bit for that location read from the frame memory is not a logical 1; and said first circuit means applying to the color look-up memory while the graphic controller produces the fast polygon display mode control signal, the color address stored at the address of the initial boundary pixel of each fill element until the terminal pixel of the fill element is read from the frame memory, thereafter applying the color address of each pixel of the horizontal scan line to the color look-up memory in synchronization with the raster scan until another initial boundary pixel of another fill element of the horizontal scan line is produced, or a terminal pixel or the end of a horizonal scan line is reached.

4. The raster graphic system of claim 3 in which the ambiguity resolution circuit includes an exclusive OR gate.

5. The raster graphic system of claim 4 in which the first circuit means includes a transparent latch.

6. Method of filling polygons displayed by a raster scan color cathode ray tube of CRT monitor of a raster graphic system, said CRT tube having an array of pixels with each pixel having a unique binary address, comprising the steps of:

a. writing into a frame random-access memory at addresses corresponding to the address of each pixel of the array a fast-fill toggle bit and a color address of a color look-up memory;
b. in a first mode of operation of the system, setting the fast-fill toggle bit of the boundary pixels defining a polygon, the interior of which is to be filled by color fill elements if, and only if, the fast-fill toggle bit of the boundary pixel was not previously set, and, if the fast-fill toggle bit of the boundary was set, resetting the fast-fill toggle bit of said boundary pixel;
c. in a second mode of operation of the system, applying the color address of each pixel in each horizontal scan line of the raster to a color look-up memory in synchronism with the raster scan of the cathode ray tube of the CRT monitor until an odd-numbered boundary pixel is sensed;
d. applying the color address of the initial boundary pixel of a color fill element sensed in step (c) to the color look-up memory until an even-numbered boundary pixel, the terminal pixel of the color fill element, is sensed;
e. repeating steps (c) and (d) until the end of the scan of each horizontal line is completed; and
f. repeating steps (c), (d) and (e) for each horizontal line of the raster as long as the system is in its second mode of operation.

7. The method of claim 6 in which the boundary pixels are sensed by their fast-fill toggle bits having been set.

8. The method of claim 7 in which a color fill element is defined by the initial and terminal boundary pixels of polygons lying on the same horizontal scan line of the raster.

* * * * *